United States Patent
Adachi et al.

(10) Patent No.: US 9,029,730 B2
(45) Date of Patent: May 12, 2015

(54) LASER PEENING APPARATUS

(75) Inventors: Takafumi Adachi, Tokyo (JP);
Toshimichi Ogisu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 706 days.

(21) Appl. No.: 11/905,488

(22) Filed: Oct. 1, 2007

(65) Prior Publication Data

US 2008/0105666 A1 May 8, 2008

(30) Foreign Application Priority Data

Oct. 2, 2006 (JP) .................................. 2006-270956

(51) Int. Cl.
*B23K 26/02* (2014.01)
*B23K 26/00* (2014.01)
*B23K 26/12* (2014.01)
*C21D 7/06* (2006.01)
*C21D 10/00* (2006.01)

(52) U.S. Cl.
CPC ............ *B23K 26/121* (2013.01); *B23K 26/0069* (2013.01); *C21D 7/06* (2013.01); *C21D 10/005* (2013.01)

(58) Field of Classification Search
USPC ............. 219/121.68, 121.69, 121.65, 121.66, 219/121.76, 121.77, 121.6, 121.85
See application file for complete search history.

(56) References Cited

U.S. PATENT DOCUMENTS

| | | | | |
|---|---|---|---|---|
| 4,207,154 A | * | 6/1980 | Lemelson | 204/157.41 |
| 4,227,582 A | * | 10/1980 | Price | 175/16 |
| 4,937,421 A | * | 6/1990 | Ortiz et al. | 219/121.68 |
| 5,127,019 A | | 6/1992 | Epstein et al. | |
| 5,760,362 A | * | 6/1998 | Eloy | 219/121.6 |
| 5,938,954 A | * | 8/1999 | Onuma et al. | 219/121.84 |
| 6,005,219 A | | 12/1999 | Rockstroh et al. | |
| 6,163,012 A | * | 12/2000 | Kimura et al. | 219/121.78 |
| 6,288,358 B1 | * | 9/2001 | Dulaney et al. | 219/121.6 |
| 6,559,415 B1 | | 5/2003 | Mannava et al. | |
| 6,923,877 B1 | * | 8/2005 | Anderson | 148/525 |
| 2005/0045607 A1 | * | 3/2005 | Tenaglia et al. | 219/121.85 |
| 2006/0133752 A1 | * | 6/2006 | Zhang | 385/125 |
| 2007/0108169 A1 | * | 5/2007 | Shimada et al. | 219/121.85 |
| 2007/0262063 A1 | * | 11/2007 | Sano et al. | 219/121.85 |

FOREIGN PATENT DOCUMENTS

| | | |
|---|---|---|
| EP | 1 667 311 A1 | 6/2006 |
| JP | 11-254157 A | 9/1999 |
| JP | 2000-246468 | 9/2000 |
| JP | 2002-346847 | 12/2000 |

(Continued)

OTHER PUBLICATIONS

Mcgraw-Hill Dictionary of Scientific and Technical Terms, Fifth Edition. Sybil Parker, Editor in Chief. Copyright 1994. Page, 926.*

(Continued)

*Primary Examiner* — Thien S Tran
(74) *Attorney, Agent, or Firm* — McGinn IP Law Group, PLLC

(57) ABSTRACT

Disclosed is a laser peening apparatus, including: a liquid holding head to shape and hold liquid to trap plasma on a local surface of a workpiece; and a laser irradiation head to irradiate the surface with laser through the liquid held in the liquid holding head.

20 Claims, 1 Drawing Sheet

(56) References Cited

FOREIGN PATENT DOCUMENTS

| | | | |
|---|---|---|---|
| JP | 2003-031466 A | | 1/2003 |
| JP | 2004-167590 A | | 6/2004 |
| JP | 2004167590 A | * | 6/2004 ............. B23K 26/16 |
| JP | 2005-272989 A | | 10/2005 |
| JP | 2006-122969 | | 5/2006 |

OTHER PUBLICATIONS

European Search Report dated Jan. 18, 2008.
Japanese Office Action issued Oct. 25, 2011 with an English translation thereof.

* cited by examiner

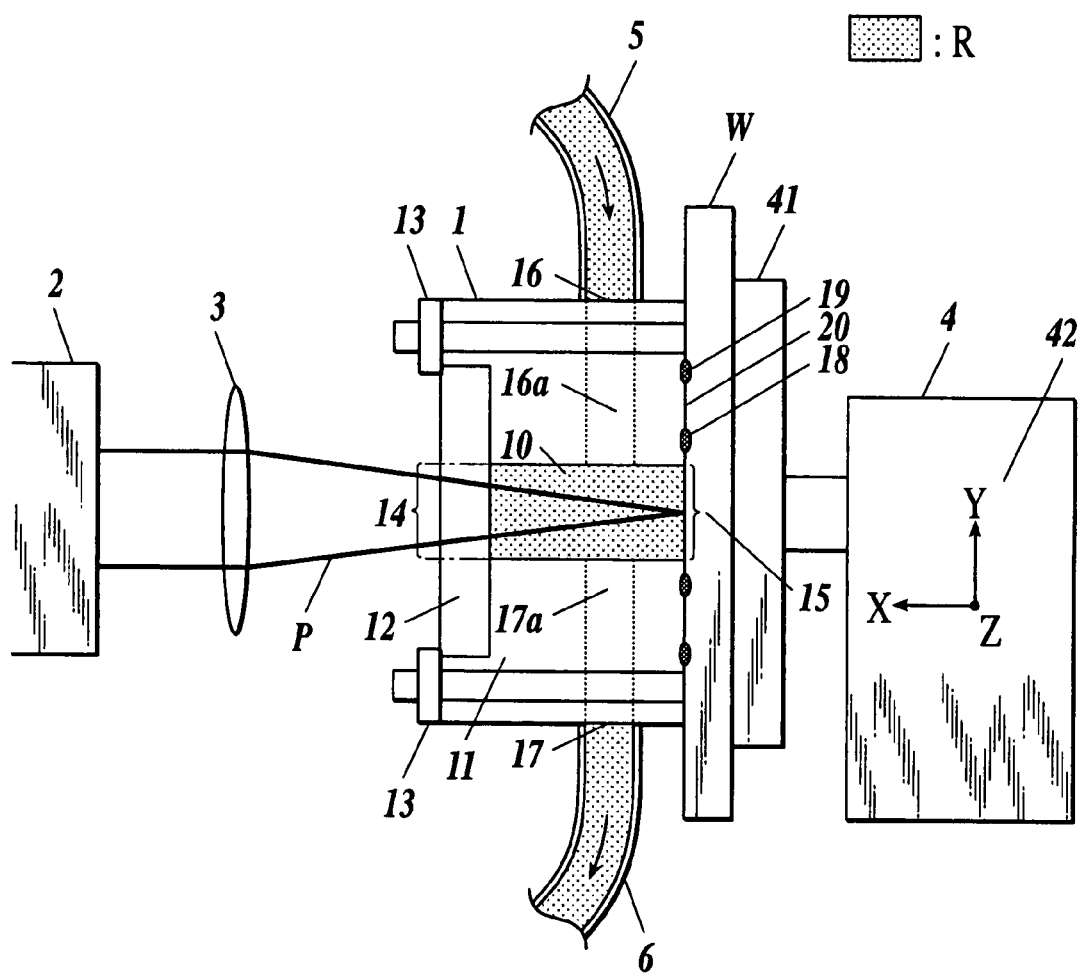

LASER PEENING APPARATUS

BACKGROUND OF THE INVENTION

1. Field of the Invention

The present invention relates to a laser peening apparatus.

2. Description of Related Art

As a method for giving a residual stress to a surface of a mechanical part or the like to reform the surface, a laser peening method is used.

Generally, working by a laser peening method is carried out in such a manner that a to-be worked surface is irradiated with a laser beam in a focusing manner, generated plasma is trapped in liquid inertial medium such as water and oil formed on the to-be worked surface, and a shock wave pressure generated thereby is given to the to-be worked surface. To effectively give the shock wave pressure produced by plasma to the to-be worked surface, it is necessary to form liquid such as water and oil for trapping the plasma on the to-be worked surface.

Japanese Patent Application Laid-open Publication No. 2000-246468 (hereinafter referred to as "Patent Document 1") and Japanese Patent Application Laid-open Publication No. 2006-122969 (hereinafter referred to as "Patent Document 2") describe laser peening methods in which a water film or other liquid film is formed on a to-be worked surface, and plasma is trapped by this liquid film. According to these publications, a protection film such as black paint is previously applied to the to-be worked surface. It is described in Patent Document 2, paragraph 0013 that running water is used as the water film.

Japanese Patent Application Laid-open Publication No. 2002-346847 (hereinafter referred to as "Patent Document 3") describes a laser peening method carried out by disposing a laser irradiation head and a workpiece in the water (see Patent Document 3, paragraph 0004, FIGS. 10 and 11).

Patent Document 3 also describes a peening method using water jet and laser in combination (see Patent Document 3, claims and FIG. 1).

However, the above techniques have the following problems.

In the laser peening method in which the laser irradiation head and the workpiece are disposed in the water as described in Patent Document 3, there is a problem that a water tank which is large enough to accept an apparatus immersible portion such as the laser irradiation head and the workpiece is required.

Irrespective of water film type, in-water type and combination type of water jet and laser, if water is used, there is a problem of corrosion, and if other liquid is used, there is a problem of contamination depending upon the kind of the liquid.

There is also a problem that liquid for trapping plasma is consumed in high volume for storing water in the water tank and for running water for forming a water film.

In the peening method using the water jet and laser in combination described in Patent Document 3, bubble pressure crushing effect is dispersed in the radial direction by fluid effect of the water jet, and although an effective area is increased, permeation depth of a residual stress becomes shallow (see Patent Document 3, paragraph 0021), an original deep working by laser peening can not be carried out.

SUMMARY OF THE INVENTION

It is, therefore, a main object of the present invention to provide a clean, energy saving and convenient laser peening apparatus which can prevent corrosion and contamination caused by liquid for trapping plasma, which can prevent mass-consumption of liquid, and which does not use a large apparatus such as a water tank.

According to a first aspect of the present invention, there is provided a laser peening apparatus, comprising:

a liquid holding head to shape and hold liquid to trap plasma on a local surface of a workpiece; and a laser irradiation head to irradiate the surface with laser through the liquid held in the liquid holding head.

According to a second aspect of the present invention, there is provided a laser peening apparatus, comprising:

a laser irradiation head; and a liquid holding head, wherein the liquid holding head comprises:

a liquid holding chamber to shape and hold liquid to trap plasma when the liquid is charged into the liquid holding chamber;

an incident window of the liquid holding chamber, which is hermetically sealed with a transparent member through which the liquid holding chamber is irradiated with laser from the laser irradiation head;

an objective window of the liquid holding chamber to bring a surface of the workpiece into contact with the liquid held by the liquid holding chamber, the objective window being disposed in a path of the laser incident in the liquid holding chamber;

an objective end surface which is provided around the objective window to seal a gap between the objective window and the surface of the workpiece, so as to prevent the liquid from leaking; and an introducing opening to introduce the liquid into the liquid holding chamber while the objective end surface and the surface of the workpiece are hermetically in contact with each other.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, wherein:

FIG. 1 is a sectional view of a laser peening apparatus according to an embodiment of the present invention.

DESCRIPTION OF THE PREFERRED EMBODIMENTS

An embodiment of the present invention will be explained with reference to the drawing. The invention is not limited to the following embodiment of the invention. FIG. 1 is a sectional view of a laser peening apparatus according to the embodiment of the present invention.

As shown in FIG. 1, the laser peening apparatus of the embodiment includes a liquid holding head 1, a laser irradiation head 2, a condenser lens 3 and a workpiece moving device 4.

The liquid holding head 1 includes a sidewall body 11, a windowpane 12, glass retaining members 13 and O-rings 18 and 19.

The sidewall body 11 is a cylinder whose opposite ends are opened. The sidewall body 11 is made of metal or other material. A liquid holding chamber 10 is formed inside the sidewall body 11. One of the openings of the sidewall body 11 is an incident window 14 of the liquid holding chamber 10, and the other opening is an objective window 15 of the liquid holding chamber 10. The incident window 14 is tightly closed by the windowpane 12. A material of the windowpane 12 is a transparent material such as quartz glass having excellent laser permeability and durability. If the objective window 15 is aligned with a surface of the workpiece W, the objective window 15 is brought into a tightly closed state.

The one opening (around the incident window 14) of the sidewall body 11 is formed with a step into which the windowpane 12 is fitted, the windowpane 12 is fitted into this, and is pressed by the glass retaining members 13 so that the windowpane 12 does not come off. The plurality of glass retaining members 13 comprise bolts, etc. and are located at a plurality of appropriate locations.

According to the embodiment, when it is necessary to replace the windowpane 12, only the windowpane 12 can be replaced, and the sidewall body 11 can be used as it is. The sidewall body 11 does not require the laser permeability.

The end surface of the sidewall body 11 around the objective window 15 is formed as an objective end surface 20 which block, in a sealing manner with the surface of the workpiece W, liquid leaking from the objective window 15. To prevent the liquid leakage more reliably, the objective end surface 20 is provided with the double O-rings 18 and 19. The O-rings 18 and 19 are sandwiched between the objective end surface 20 and the surface of the workpiece W under pressure and is compressed and deformed, thereby enhancing the adhesion with respect to the objective end surface 20 and the surface of the workpiece W, and enhancing the sealing ability. Other means may be used as the sealing structure.

The sidewall body 11 is formed at its outer peripheral surface with a liquid introducing opening 16 and a liquid discharge opening 17. The sidewall body 11 is formed at its wall with a liquid introducing passage 16a connected to the liquid introducing opening 16 and the liquid holding chamber 10, and a liquid discharging passage 17a connected to the liquid discharge opening 17 and the liquid holding chamber 10.

The liquid introducing opening 16 and the liquid introducing passage 16a, as well as the liquid discharge opening 17 and the liquid discharging passage 17a may be formed into the same shapes or different shapes. It is unnecessary to determine which opening or passage is for introducing liquid or discharging liquid, or it is possible to determine the same. The opening or the passage may be used for both introducing liquid and discharging liquid. In this embodiment, one of them is used for introducing liquid and the other is used for discharging liquid.

One end of a liquid introducing tube 5 is connected to the liquid introducing opening 16. One end of a liquid discharging tube 6 is connected to the liquid discharge opening 17. A liquid tank in which water, oil or other liquid R for trapping plasma is stored, a pump for pumping the liquid R into the liquid holding chamber 10, a valve and the like are disposed at the other end of the liquid introducing tube 5 (all of these elements are not shown). A liquid discharging tank, a valve and the like are disposed at the other end of the liquid discharging tube 6. The liquid tank and the liquid discharging tank may commonly be used or they may be of circulation type.

The liquid introducing opening 16 has a structure as described above, and can introduce liquid R into the liquid holding chamber 10 in a state where a gap between the objective end surface 20 and the surface of the workpiece W is sealed.

The liquid discharge opening 17 has a structure as described above, and can discharge liquid R from the liquid holding chamber 10 in a state where a gap between the objective end surface 20 and the surface of the workpiece W is sealed.

As shown in FIG. 1, the laser irradiation head 2, the condenser lens 3, the incident window 14 and the objective window 15 are disposed on an optical axis of laser which is output from the laser irradiation head 2. The condenser lens 3 is disposed between the laser irradiation head 2 and the incident window 14 along a path of the laser.

In the laser path from the laser irradiation head 2 to the objective window 15, an appropriate optical part may be disposed and an optical axis of the laser may be bent by reflection or refraction. For example, a mirror may be disposed in the liquid holding chamber 10, and an incident direction of the laser to the incident window 14 and a traveling direction of the laser to the objective window 15 may be set at right angle and such changes in the structure may be done optionally. However, a part disposed in the liquid holding chamber 10 may be corroded by the liquid R. In the embodiment, the laser path from the incident window 14 to the objective window 15 is made straight as shown in FIG. 1.

The workpiece moving device 4 can move a moving base 41 in intersecting three axial directions, and can comprise machines such as a screw shaft and a gear. It is preferable that the workpiece moving device 4 includes a motor and a control device and the moving base 41 can be numerically controlled.

The liquid holding head 1, the laser irradiation head 2, the condenser lens 3 and a main body 42 of the workpiece moving device 4 are fixed to a base stage (not shown) by an appropriate fixing tool and support tool.

Next, a working operation by the laser peening apparatus of the embodiment having the above-described structure will be explained.

First, the workpiece W is fixed to the moving base 41.

Next, the workpiece W is moved in the X axis direction as shown in FIG. 1 by the workpiece moving device 4, and a surface of a to-be worked portion of the workpiece W is pressed against the objective end surface 20 (O-rings 18 and 19). With this, the gap between the objective end surface 20 and the surface of the workpiece W is sealed.

Next, liquid R is introduced and charged into the liquid holding chamber 10 from the liquid introducing opening 16. With this, the liquid R is charged into the liquid holding chamber 10, the liquid R is formed into the shape of the liquid holding chamber 10 on the surface of the local of the workpiece W, and the liquid R is held in the shape of the liquid holding chamber 10 (held in a certain shape).

Next, pulse laser P is output from the laser irradiation head 2, and the surface of the workpiece W exposed to the liquid holding chamber 10 is irradiated with the pulse laser P. The pulse laser P which is output from the laser irradiation head 2 is focused on the surface of the workpiece W exposed to the liquid holding chamber 10 by the condenser lens 3. The pulse laser P is light-gathered (focused), passes through the windowpane 12 and the liquid R in the liquid holding chamber 10, and the surface of the workpiece W exposed to the liquid holding chamber 10 is irradiated with the pulse laser P.

If the surface of the workpiece W exposed to the liquid holding chamber 10 is irradiated with the pulse laser P, plasma is generated in the liquid R charged in the liquid holding chamber 10 near the surface of the workpiece W.

The generated plasma is trapped by the liquid R charged in the liquid holding chamber 10, and a shock wave pressure caused by plasma explosion is effectively given to the workpiece W.

A compressed residual stress remains on the surface of the workpiece W to which the shock wave pressure is given.

With this above operation, the workpiece W is subjected to the laser peening working.

During the working, a valve on the liquid discharge opening 17 may be closed and the liquid R in the liquid holding chamber 10 may be held in the stationary state, or the charged state of the liquid R in the liquid holding chamber 10 may be maintained, the liquid R is introduced from the liquid introducing opening 16 and the liquid R is discharged from the liquid discharge opening 17 at the same time, and the liquid R in the liquid holding chamber 10 may be maintained at its flowing state.

The workpiece W is moved in Y and Z axial directions shown in FIG. 1 by the workpiece moving device 4, and a portion of the workpiece W which has not yet been worked but must be worked is subjected to the laser peening working in the same manner. At that time, the workpiece W is moved in a state where the gap between the objective end surface 20 and the surface of the workpiece W is sealed.

If necessary working is completed, the open end and the other open end of the liquid introducing tube 5 connected to the liquid introducing opening 16 are opened to lower the pressure therein lower than the atmospheric pressure, and the liquid R is discharged from the liquid discharge opening 17 to empty the liquid holding chamber 10. Thereafter, the workpiece W is moved in the X axis direction by the workpiece moving device 4, the workpiece W is separated from the liquid holding head 1, and the workpiece W is taken out from the moving base 41.

According to the embodiment, the liquid R is tightly closed in the liquid introducing tube 5, the liquid holding head 1 and the liquid discharging tube 6 during the working, and a leakage amount of liquid R to outside when the workpiece W is taken out can be suppressed to a small amount. A consumption amount of liquid R can also be suppressed to a small amount. Therefore, liquid other than water can easily be used as liquid for trapping plasma.

In the water film type or in-water type laser peening method, it is difficult to use liquid other than water as liquid for trapping plasma due to problem of contamination and consumption amount. When laser peening working is carried out for an aluminum part which is widely used for an aircraft part using water as liquid for trapping plasma, there is a problem that a drying step is required for preventing corrosion after the working.

According to the embodiment, however, since anticorrosive liquid can be used as the liquid R, all of the above problems can be solved.

If liquid having density higher than that of water is applied to the laser peening as liquid for trapping plasma, a higher compressed residual stress can be given to a workpiece.

When liquid other than water is used in the in-water type laser peening, the laser permeability is largely deteriorated due to transparency in some cases, and there is a problem that sufficient peening effect can not be given to the workpiece material.

According to the embodiment, it is possible to use liquid having density higher greater than that of water, liquid which is more expensive than water and liquid having transparency lower than water without worrying about problems of contamination, consumption amount and transparency, and it is possible to benefit from the technique such as beneficial working characteristics obtained by the liquid.

As explained above, the laser peening apparatus of the embodiment is clean, energy saving and convenient, and general versatility of the laser peening apparatus can be enhanced.

If the laser peening apparatus of the embodiment is applied, it is possible to enhance the general versatility of the laser peening using liquid having function other than water as the liquid for trapping plasma.

According to an experiment performed by the present inventors, a residual stress which is the same as that of the in-water laser peening could be given by the laser peening apparatus of the embodiment using water as the liquid R.

According to a first aspect of the preferred embodiments of the present invention, there is provided a laser peening apparatus, comprising:

a liquid holding head to shape and hold liquid to trap plasma on a local surface of a workpiece; and a laser irradiation head to irradiate the surface with laser through the liquid held in the liquid holding head.

According to a second aspect of the preferred embodiments of the present invention, there is provided a laser peening apparatus, comprising:

a laser irradiation head; and a liquid holding head, wherein the liquid holding head comprises:

a liquid holding chamber to shape and hold liquid to trap plasma when the liquid is charged into the liquid holding chamber;

an incident window of the liquid holding chamber, which is hermetically sealed with a transparent member through which the liquid holding chamber is irradiated with laser from the laser irradiation head;

an objective window of the liquid holding chamber to bring a surface of the workpiece into contact with the liquid held by the liquid holding chamber, the objective window being disposed in a path of the laser incident in the liquid holding chamber;

an objective end surface which is provided around the objective window to seal a gap between the objective window and the surface of the workpiece, so as to prevent the liquid from leaking; and an introducing opening to introduce the liquid into the liquid holding chamber while the objective end surface and the surface of the workpiece are hermetically in contact with each other.

According to the preferred embodiments, the liquid holding head for shaping and holding liquid which traps plasma is provided on the surface of the local which is to be worked of the workpiece. Therefore, it is possible to prevent the laser irradiation head, other devices, parts which need not be worked, and an operator from coming into contact with liquid by immersion or water sprinkle.

Thus, according to the preferred embodiments, it is possible to prevent corrosion and contamination by liquid, and the apparatus is clean.

According to the preferred embodiments, a large device such as a water tank is not used, it is possible to suppress the consumption amount of liquid, apparatus constituting materials and consumption materials can be reduced, as a result, energy when production and use can be saved, consumption of resource can be reduced and energy can be saved.

In addition, a large device such as the water tank is not used, the laser peening apparatus can be applied to an existing part such as transportation equipment such as an aircraft in use, and an application range can remarkably be widened.

According to the preferred embodiments, it is unnecessary to handle liquid in high volume, the size of the workpiece is not limited, deterioration of ease of use caused by immersion of a device such as the laser irradiation head and water sprinkle at a workplace is reduced and thus, convenience for a user is enhanced. For example a laser irradiation head can easily be replaced by new one and maintenance after use can easily be performed. A device such as the laser irradiation head need not be subjected to waterproof treatment.

According to the preferred embodiments, it is possible to constitute a clean, energy-saving convenient laser peening apparatus.

The entire disclosure of Japanese Patent Application No. 2006-270956 filed on Oct. 2, 2006 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A laser peening apparatus, comprising:
a liquid holding head including:
    a liquid holding chamber to shape and hold a liquid in a direct contact with a local surface of a workpiece; and
    an incident window located on an edge of the liquid holding chamber, the liquid extending from a surface of the incident window to the local surface;
a laser irradiation head to irradiate the local surface with a laser beam through the liquid held in the liquid holding chamber; and
a moving device configured so as to move the workpiece in a direction toward the liquid holding head so as to press the local surface of the workpiece against the liquid holding head and configured to move the workpiece in a direction orthogonal to the direction toward the liquid holding head,
wherein the liquid is adapted for trapping a plasma generated by the laser irradiation,
wherein the liquid is in a sealed contact with a surface of the workpiece around the local surface,
wherein the liquid holding head is configured such that the liquid flowingly contacts the surface of the workpiece around the local surface, and
wherein the liquid holding head is configured such that, if the workpiece is moved in the direction orthogonal to the direction toward the liquid holding head, the liquid holding head holds the liquid in a constant shape.

2. The laser peening apparatus according to claim 1, wherein the liquid holding head holds the liquid in a stationary state.

3. The laser peening apparatus according to claim 1, wherein the liquid holding head holds the liquid in one of a stationary state and a flowing state.

4. The laser peening apparatus according to claim 1, wherein the liquid holding head holds the liquid in a certain shape while the liquid holding head is stationary, and
wherein the moving device is configured so as to move the workpiece while the liquid holding head holds the liquid in the certain shape.

5. The laser peening apparatus according to claim 1, further comprising a condenser lens disposed between the laser irradiation head and the liquid holding head.

6. A laser peening apparatus, comprising:
a laser irradiation head; and
a liquid holding head,
wherein the liquid holding head comprises:
    a liquid holding chamber to shape and hold a liquid to trap a plasma when the liquid is charged into the liquid holding chamber;
    an incident window located on an edge of the liquid holding chamber, which is hermetically sealed with a transparent member through which the liquid holding chamber is irradiated with laser from the laser irradiation head;
    an objective window of the liquid holding chamber to bring a local surface of the workpiece into direct contact with the liquid held by the liquid holding chamber, the objective window being disposed in a path of the laser incident in the liquid holding chamber;
    an objective end surface which is provided around the objective window to seal a gap between the objective window and a surface around the local surface of the workpiece, so as to prevent the liquid from leaking; and
    an introducing opening to introduce the liquid into the liquid holding chamber while the objective end surface and the surface of the workpiece are hermetically in contact with each other; and
a moving device configured so as to move the workpiece in a direction toward the liquid holding head so as to press the surface around the local surface of the workpiece against the liquid holding head and configured to move the workpiece in a direction orthogonal to the direction toward the liquid holding head,
wherein the laser irradiation head irradiates the local surface with a laser beam through the liquid held in the liquid holding chamber,
wherein the liquid holding head is configured such that the liquid flowingly contacts the surface of the workpiece around the local surface,
wherein the liquid holding head is configured such that, if the workpiece is moved in the direction orthogonal to the direction toward the liquid holding head, the liquid holding head holds the liquid in a constant shape, and
wherein the liquid extends from a surface of the incident window to the local surface.

7. The laser peening apparatus according to claim 6, wherein the liquid holding head further comprises a discharge opening to discharge the liquid from the liquid holding chamber while the gap between the objective end surface and the surface of the workpiece is sealed, the discharge opening being different from the introducing opening.

8. The laser peening apparatus according to claim 6, wherein the moving device is configured so as to move the workpiece in the direction orthogonal to the direction toward the liquid holding head while the gap between the objective end surface and the surface of the workpiece is sealed.

9. The laser peening apparatus according to claim 6, further comprising a condenser lens disposed between the laser irradiation head and the incident window.

10. A laser peening method, comprising:
fixing a workpiece to a moving base;
moving the workpiece in a direction toward a liquid holding chamber so as to press the workpiece against an objective end surface of the liquid holding chamber, so that the objective end surface and the workpiece hermetically contact each other;
introducing a liquid into the liquid holding chamber, to bring a surface of the workpiece into direct contact with the liquid;
irradiating the liquid introduced into the liquid holding chamber with a laser;
applying a shockwave pressure to the workpiece; and
moving the workpiece in a direction orthogonal to the direction toward the liquid holding chamber such that the liquid holding chamber holds the liquid in a constant shape, wherein the liquid holding chamber is configured such that the liquid flowingly contacts the surface of the workpiece, and wherein the liquid extends from a surface of an incident window located on an edge of the liquid holding chamber to the surface of the workpiece.

11. The laser peening method according to claim 10, further comprising emptying the liquid from the liquid holding chamber, after the shockwave pressure has been applied to the workpiece.

12. The laser peening apparatus according to claim 1, wherein the incident window is hermetically sealed with a transparent member through which the liquid holding chamber is irradiated with laser from the laser irradiation head, wherein the liquid holding head further comprises an objective window located on an opposite end of the liquid holding chamber, wherein the objective window brings a surface of the workpiece into direct contact with the liquid held by the liquid holding chamber, and wherein the incident window and the objective window are located on an axial path of the laser incident in the liquid holding chamber.

13. The laser peening apparatus according to claim 1, further comprising:

an introducing opening to introduce the liquid into the liquid holding chamber;

a discharging opening to discharge the liquid from the liquid holding chamber; and a valve to close the discharging opening.

14. The laser peening apparatus according to claim 1, further comprising:

an introducing opening to introduce the liquid into the liquid holding chamber; and a discharging opening to discharge the liquid from the liquid holding chamber, wherein the liquid discharged from the liquid holding chamber through the discharging opening is circulated into the liquid holding chamber through the introducing opening.

15. The laser peening apparatus according to claim 6, the liquid holding head further comprising:

a discharging opening to discharge liquid from the liquid holding chamber, and the laser peening apparatus further comprising:

a valve to close the discharging opening.

16. The laser peening apparatus according to claim 6, the liquid holding head further comprising:

a discharging opening to discharge the liquid from the liquid holding chamber, wherein the liquid discharged from the liquid holding chamber through the discharging opening is circulated into the liquid holding chamber through the introducing opening.

17. The laser peening method according to claim 10, wherein the liquid holding chamber is filled with the liquid when the liquid is introduced.

18. The laser peening apparatus according to claim 1, wherein the liquid holding head further comprises a metal sidewall in which the liquid holding chamber is formed.

19. The laser peening method according to claim 10, wherein the gap between the objective end surface and the surface of the workpiece is sealed during the moving the workpiece in the direction orthogonal to the direction toward the liquid holding chamber.

20. The laser peening apparatus according to claim 1, wherein the liquid comprises a single liquid, in the direction that the workpiece moves toward the liquid holding head, the single liquid extending from the surface of the incident window to the local surface.

* * * * *